United States Patent [19]
Kuroda et al.

[11] 3,876,728

[45] Apr. 8, 1975

[54] URETHANE RESINS FROM TOLYLENE DIISOCYANATE DISTILLATION RESIDUES ACTIVE HYDROGEN CONTAINING COMPOUNDS AND VINYL MONOMERS

[75] Inventors: Akira Kuroda; Masaaki Hirooka, both of Tokyo, Japan

[73] Assignee: Hodogaya Chemical Co., Ltd., Tokyo, Japan

[22] Filed: Mar. 16, 1973

[21] Appl. No.: 342,137

[30] Foreign Application Priority Data
Mar. 18, 1972 Japan................................ 47-27070

[52] U.S. Cl..... 260/859 R; 260/23 TN; 260/75 NT; 260/77.5 AT; 260/77.5 CR
[51] Int. Cl............................................ C08g 41/04
[58] Field of Search.................. 260/859 R, 77.5 AT

[56] References Cited
UNITED STATES PATENTS
3,304,273  2/1967  Stamberger..................... 260/859 R
3,479,384  11/1969  Heiss............................ 260/77.5 AT
3,522,285  7/1970  Hirss............................ 260/77.5 AT
3,700,752  10/1972  Hutchinson..................... 260/859 R
3,723,363  3/1973  Shaw............................ 260/77.5 AT Primary Examiner—Paul Lieberman
Attorney, Agent, or Firm—Ladas, Parry, Von Gehr, Goldsmith & Deschamps

[57] ABSTRACT

A novel cured resin is produced by reacting an active hydrogen-containing compound with a solution in a polymerizable unsaturated monomer of the NCO group-containing distillation residue obtained in the production of tolylene diisocyanate from tolylene diamine or its salt and phosgene, in the presence of a polymerization catalyst, and the resin thus obtained is superior in thermal resistance, mechanical strength, adhesion, solvent resistance, chemical resistance, etc. to a polymer obtained by polymerizing the above polymerizable unsaturated monomer alone in the same manner.

5 Claims, No Drawings

URETHANE RESINS FROM TOLYLENE DIISOCYANATE DISTILLATION RESIDUES ACTIVE HYDROGEN CONTAINING COMPOUNDS AND VINYL MONOMERS

This invention relates to a process for producing a cured resin using the NCO group-containing distillation residue obtained in the production of tolylene diisocyanate (referred to hereinafter as TDI) from tolylene diamine or its salt and phosgene, and to the cured resin obtained by this process.

In the production of TDI, a considerable amount of the NCO-containing distillation residue is obtained (said residue usually contains 15 to 30% of NCO group though this content varies depending upon the termal conditions at the time of distillation of TDI, and the residue is a brittle solid at ordinary temperature). Said distillation residue, however, has hardly been utilized, and various attempts have recently been made on the utilization of the residue. For example, the residue is mixed with tar and the resulting mixture is applied to paving a road, or alternatively, the residue is subjected to urethane-formation reaction with a hydroxyl group-containing component to obtain a polyurethane resin.

However, the distillation residue is inferior in solvent-solubility and storage-stability, and is low in compatibility with the hydroxyl compound. Therefore, the utilization of the residue has not sufficiently been satisfactory, and at present, the residue is compelled to be wasted without being utilized.

The present inventors have done research on the solubility of the TDI distillation residue in various solvents, and have consequently discovered that the residue is very much compatible with polymerizable unsaturated monomers, the stability of the solution of the residue in the monomer on storage is very good and the solution can be reacted with a compound having active hydrogen capable of reacting with isocyanate group, in the presence of a polymerization catalyst to obtain a cured resin which is useful in industry.

The object of this invention is to provide a process for producing a cured resin, which comprises dissolving the NCO group-containing TDI distillation residue in a polymerizable unsaturated monomer, such as styrene, vinyl acetate, etc., and reacting the resulting solution with an active hydrogen-containing compound capable of reacting with isocyanate, in the presence of a polymerization catalyst and to provide the cured resin.

According to the process of this invention, a urethane linkage or urea linkage is formed by the reaction of the TDI distillation residue with the active hydrogen-containing compound, and hence, there can be obtained a resin superior in thermal resistance, mechanical strength, adhesion, solvent resistance, chemical resistance, etc. to a polymer obtained from the polymerizable unsaturated monomer alone. When the solution of the TDI distillation residue in the polymerizable unsaturated monomer is reacted with an unsaturated, active hydrogen-containing compound in the presence of a polymerization catalyst, the reaction product is rapidly cured at room temperature to form a transparent, hard resin. For example, when an unsaturated, hydroxy-terminated polyester (an unsaturated polyester synthesized from maleic anhydride, propylene glycol and phthalic anhydride) is added to a 50% solution of the TDI distillation residue in styrene and catalytic amounts of methyl ethyl ketone peroxide and cobalt naphthenate are added thereto, the reaction product is rapidly cured at room temperature. The thus obtained cured resin does not have the disadvantages of conventional unsaturated polyester resin, that is, low thermal resistance, low alkali resistance, high shrinkage, low adhesion, etc. In this case, it is understood that there are simultaneously caused the urethane formation reaction between the TDI distillation residue and the terminal hydroxyl group of the unsaturated polyester and the polyaddition reaction through the unsaturated bonds to form a crosslinked copolymer resin, and hence, the resin has the above-mentioned excellent properties.

The polymerizable unsaturated monomer used in this invention includes monvinyl monomers, such as styrene, vinyl acetate, vinyl chloride, acrylates, methacrylates, acrylonitrile, acrolein, etc.; divinyl monomers, such as diallyl phthalate, butadiene, chloroprene, etc.; vinylidene monomers, such as vinylidene chloride, etc., and these may be used alone or in admixture of two or more.

The active hydrogen-containing compound used in this invention includes alcohols, such as ethylene glycol, propylene glycol, diethylene glycol, dipropylene glycol, glycerine, trimethylol propane, etc., and polyether polyols produced by polyaddition reaction between the above-mentioned alcohol and ethylene oxide or propylene oxide; saturated or unsaturated polyesters; 2-hydroxyethyl methacrylate; castor oil; hydroxy-containing unsaturated compounds, such as hydroxy-containing polybutadiene; aliphatic amines, such as ethylenediamine; polyamides; aromatic amines, such as 4,4-diaminodiphenylmethane, 3,3-dichloro-4,4-diaminodiphenylmethane; aminoalcohols; phenols; bitumens; and water (including moisture), and these may be used alone or in admixture of two or more.

The polymerization catlyst used in this invention includes peroxides, such as benzoyl peroxide, methyl ethyl ketone peroxide, lauroyl peroxide, cumene hydroperoxide, potassium persulfate, etc.; organic nitrogen compounds, such as 2,2'-azobisisobutylonitrile, diazoaminobenzene, N-nitrosoacetoanilide, etc., organic polysulfides, such as tetramethyl thiuram disulfide; redox catalysts, such as combination of potassium peroxide and sodium meta-bisulfide, combination of benzoyl peroxide and dimethylaniline, combination of methyl ethyl ketone peroxide and cobalt naphthenate, etc.; Lewis acids, such as tin tetrachloride, boron trifluoride, aluminum chloride, etc., and these are selected depending upon the reactivity of the polymerizable monomer and reaction conditions.

In carrying out this invention, the preparation of the distillation residue solution may be effected by gradually pouring into the polymerizable unsaturated monomer the distillation residue in the distillation still while it is in the molten state at high temperatures. Alternatively, the distillation residue may be taken out of the distillation still to solidify it, ground and then heated with the polymerizable unsaturated monomer to dissolve it in the latter. In this case, however, it is necessary to direct attention to thermal polymerization reaction of the polymerizable monomer. The concentration of the distillation residue in the solution is preferably 30 to 70percent, more preferably about 50percent, considering the viscosity of the solution and the physical properties of the resulting cured resin. The equivalent ratio of the isocyanate group in the distillation residue solution to the active hydrogen is preferably 0.5 to 2.0, most preferably 1.0 to 1.1.

The amount of the polymerizable unsaturated monomer in the cured resin of this invention may vary in the range of from 20 to 80percent though 50 to 60percent is preferred to obtain a cured resin having balanced physical properties.

The amount of the polymerization catalyst added is suitably 0.1 to 5percent based on the total weight of the cured resin of this invention. The polymerization catalyst may previously be added to the distillation residue solution or the active hydrogen compound in such an amount that its stability on storage may not be affected.

In curing according to the process of this invention, the reaction between the isocyanate group in the distillation residue and the active hydrogen compound proceeds at a temperature of 5° to 20°C in almost all cases, while the polymerization reaction of the polymerizable unsaturated monomer can proceed at room temperature in some cases such as in the case of unsaturated polyesters, but in other cases, heating is required. In the case of heat-curing, it is preferably to mix the curing component with the other components, allow the resulting mixture to stand at room temperature for 2 to 4 hours to gelate the mixture, and then heat the same at 60°–150°C for 2 –5 hours.

According to the process of this invention, the polymerizable unsaturated monomer per se is cured through modification, crosslinking or copolymerization, and hence, a 100percent cured resin is obtained. Therefore, the excellent properties of the resin can be displayed when used as surface coatings; FRP laminates; adhesives; modifiers for rubbers, such as SBR, polybutadiene, ABS, etc. or plastics; or resins for civil engineering and construction, such as for resin concretes, surface treating agents or soil stabilizers by injection into soil by use along with aggregate, filler or bitumen.

The invention is further explained in detail by reference to the following Examples which are not by way of limitation but by way of illustration and in which parts and percent are by weight unless otherwise specified.

EXAMPLE 1

In 40 parts of styrene having added thereto 40 ppm of p-tert.-butylcatechol was dissolved 40 parts of a TDI distillation residue having an NCO content of 20.7 percent at 70°–80°C in a period of 10 to 20 min to prepare a 50 percent solution of the TDI distillation residue in styrene. The viscosity of the solution was 2 to 3 poises (25°C) and did not elevate even when stored at 40°C for 3 months. On the other hand, when 2 parts of benzoyl peroxide was added to 20 parts of T-400 (a trade name of Asahi Denka for a polyether triol having a molecular weight of 400) and the resulting mixture was mixed with 80 parts of the above solution of the distillation residue in styrene at room temperature, the mixture gelled at 20°C in 2 hours. The thus gelated material was heated at 80°C for 4 hours to obtain a transparent, cured resin having good resistance to heat distortion and solvent and good adhesion. This cured resin had a bending strength of 7.3 kg/mm$^2$ and a Charpy impact strength of 2.3 kg.cm/cm$^2$. The bending strength was determined as follows: A square rod of 12.5 ×12.5 ×125 mm was formed under the predetermined conditions and a load was applied to the center of the rod at a 10 cm distance between two fulcrums to measure the load at which the rod was broken. In this case, the loading rate was 5 mm/min. The Charpy impact strength was a value obtained by dividing by the original cross section area of the notched part of the test specimen the total impact energy absorbed when the test specimen was broken by use of a Charpy impact tester.

EXAMPLE 2

In the same manner as in Example 1, 85.7 parts of a 50 percent solution of the TDI distillation residue in methyl methacrylate having added thereto 30 ppm of p-tert.-butylcatechol was prepared. Separately, there was prepared a mixture of 14.3 parts of dipropylene glycol and 2 parts of benzoyl peroxide. These two liquides were together subjected to 20°C for two hours and 70°C for four hours to be cured. The thus cured resin was transparent and brown and had good resistance to heat distortion and solvent and good adhesion. As measured in the same manner as in Example 1, the bending strength and Charpy impact strength of the resin were 7.8 kg/mm$^2$ and 4.5 kg.cm/cm$^2$, respectively.

EXAMPLE 3

In the same manner as in Example 1, 91 parts of a 50 percent solution of the TDI distillation residue in vinyl acetate was prepared. On the other hand, 1.5 parts of methyl ethyl ketone peroxide was added to 90 parts of neopentyl glycol. These two liquids were mixed to prepare a solution, which was then subjected to 20°C for 2 hrs and 80°C for 4 hrs to cure the solution, thereby obtaining a brown, transparent resin having a good adhesion. The solution before curing was applied to a mild steel plate, cured at room temperature and then subjected to measurement of tensile shear strength to find that the strength was 68 kg/cm$^2$. The tensile shear strength was measured with an area of 50 ×50 mm at a drawing velocity of 5 mm/min.

EXAMPLE 4

A solution of 16.6 parts of castor oil, 16.6 parts of furfuryl alcohol and 2 parts of benzoyl peroxide was mixed with 66.8 parts of a 50 percent solution of the TDI distillation residue in styrene prepared in the same manner as in Example 1 and then subjected to curing at 20°C for 2 hrs and 80°C for 4 hrs to obtain a brown, transparent cured resin having excellent adhesion and chemical resistance. The mixture before curing was applied to a mild steel plate, cured at room temperature and then subjected to measurement of tensile shear strength in the same manner as in Example 3 to find that the strength was 58 kg/cm$^2$.

EXAMPLE 5

In the same manner as in Example 1, 46 parts of a 50 percent solution of the TDI distillation residue in styrene was prepared. On the other hand, 40 parts of a commercially available unsaturated polyester resin (Rigolac No. 2260, a trade name of Showa Kobunshi Kabushiki Kaisha) was mixed with 14 parts of T-400 to obtain a solution. The two solutions were mixed while adding thereto 1 part of methyl ethyl ketone peroxide and 0.5 part of cobalt naphthenate to obtain a mixed solution. This solution was allowed to stand at room temperature (20°C) for 7 hrs to obtain a brown, transparent, hard resin having the physical properties shown in Table 1.

Table 1

| | Bending strength (kg/mm²) | Charpy impact strength (kg·cm/cm²) | Heat[1] distortion temperature (°C) |
|---|---|---|---|
| Cured resin of present invention | 9.0 | 2.5 | 100 |
| Commercially available unsaturated polyester | 8.0 | 2.2 | 70 |

| | Alkali[2] resistance | Tensile shear strength (kg/cm²) | Cure-[3] shrinkage |
|---|---|---|---|
| | Only disappearance of surface gloss | 65 | 2 × 10⁻¹ |
| | Surface layer was broken | 30 | 2 × 10⁻² |

Note:
(1) A square rod of 12.5 × 12.5 × 125 mm was made, a load of 18 kg was applied thereto and heated in an oil bath at a rate of 1°C/min. The temperature at which 2.5 mm deformation was observed was determined to be heat distortion temperature.
(2) Soaked in a 48% aqueous sodium hydroxide solution as 80°C for 72 hrs.
(3) The resin was shaped under predetermined conditions in a disc mold having a diameter of 45 mm and a thickness of 14.8 mm, and the ratio of the difference between the diameter of the mold and the diameter of the shaped article to the diameter of the mold was determined to be cure-shrinkage.
(4) The other conditions were the same as in the preceding Examples.

Separately, the above mixed solution was applied to a mild steel plate, cured at room temperature and tested for physical properties of coating to obtain the results shown in Table 2.

Table 2

| | Erichsen (mm) | (1) Dupont impact (cm) | Cross-cut (points) | Pencil hardness |
|---|---|---|---|---|
| Present resin | 7.5 | 30 | 10 | 3H |
| Commercially available unsaturated polyester | 4.7 | 10 | 0 | 2H |

Note:
(1) The test was effected under conditions of ⅛" and 0.3 kg according to AASTM D-256-57T. The above test proves that there is obtained a hard coating having good flexibility and adhesion.

EXAMPLE 6

1.5 Parts of methyl ethyl ketone peroxide and 0.7 part of cobalt naphthenate were mixed with 80 parts of a 70 percent styrene solution of a hydroxy-terminated unsaturated polyester glycol (OH value: 175, acid value: 5) synthesized from 98 parts of maleic anhydride, 146 parts of adipic acid and 228 parts of propylene glycol, and 70 parts of a 50 percent styrene solution of the TDI distillation residue prepared in the same manner as in Example 1. Curing was caused at room temperature to obtain a transparent, hard resin. In the same manner as in Example 1, it was found that the resin had a bending strength of 8.2 kg/mm² and a Charpy impact strength of 4.8 kg.cm/cm².

EXAMPLE 7

To 100 parts of a 50 percent solution of the TDI distillation residue in styrene prepared in the same manner as in Example 1 was added 2 parts of tin tetrachloride, and the resulting mixture was mixed with 300 parts of sand containing 5 percent of water, whereupon curing was caused at room temperature with foaming, to obtain a cured product having water-resistance.

EXAMPLE 8

With 1 part of methyl ethyl ketone peroxide and 100 parts of a 50 percent styrene solution of 3,3'-dichloro-4,4'-diaminodiphenylmethane was mixed 75 parts of a 50 percent solution of the TDI distillation residue in styrene prepared in the same manner as in Example 1, and the resulting mixture was subjected to 20°C for 2 hrs and 80°C for 4 hrs to obtain a hard, lustrous resin. When the thus obtained cured resin was further cured at 120°C for 2 hrs there was obtained a very hard resin having a pencil hardness of 5H and excellent thermal resistance.

EXAMPLE 9

Upon mixing simultaneously 100 parts of a 50 percent solution of the TDI distillation residue in styrene prepared in the same manner as in Example 1, 200 parts of 5 percent-water-containing sand containing 3 parts of potassium persulfate and 200 parts of 5 percent-water-containing sand containing 2 parts of sodium meta-bisulfite, curing was caused with foaming at room temperature to obtain a hard, water-resistant, oil-resistant cured product. This product was subjected to measurement of compression strength by use of a polyvinyl chloride pipe having a diameter of 50 mm and a height of 100 mm to find that it was 60.5 kg/cm².

What is claimed is:

1. A method for preparing a cured resin, which comprises reacting in the presence of a polymerization catalyst an active hydrogen-containing compound with a solution in a polymerizable unsaturated monomer of the NCO-containing distillation residue obtained in the production of tolylene diisocyanate from tolylene diamine or its salt and phosgene, whereby said distillation residue amounts to between 30 and 70 percent of said solution, the equivalent ratio of NCO: active hydrogen is 0.5:2.0 and the amount of polymerized unsaturated monomer in the final resin is between 20 and 80 percent.

2. A method for preparing a cured resin, which comprises reacting a solution of the NCO-containing distillation residue obtained in the production of tolyene diisocyanate from tolyene diamine or its salt and phosgene, in a polymerizable monomer selected from the group consisting of styrene, methyl methacrylate and vinyl acetate, with an active hydrogen-containing compound selected from the group consisting of polyether polyols, dipropylene glycol, neopentyl glycol, castor oil, furfuryl alcohol, unsaturated polyester resins, hydroxy-terminated unsaturated polyester glycols and water in the presence of a polymerization catalyst selected from the group consisting of benzoyl peroxide, methyl ethyl ketone peroxide, a combination of cobalt naphthenate and methyl ethyl ketone peroxide, a combination of benzoyl peroxide and dimethylaniline, a combination of sodium metabisulfate and potassium persulfate, and tin tetrachloride, whereby said distillation residue amounts to between 30 and 70 percent of said solution, the equivalent ratio of NCO: active hydrogen is 0.5:2.0 and the amount of polymerized unsaturated monomer in the final resin is between 20 and 80 percent.

3. A method according to claim 1, wherein the polymerizable unsaturated monomer is styrene, the active hydrogen-containing compound is a combination of an unsaturated polyester resin and polyether triol, and the polymerization catalyst is a combination of methyl ethyl ketone peroxide and cobalt naphthenate.

4. A method according to claim 1, wherein the solution and the active hydrogen-containing compound are subjected to polymerization at a temperature of 5° to 150°C in the presence of the polymerization catalyst in an amount corresponding to 0.1 to 5 percent by weight based on the weight of the final cured product.

5. A cured resin composition obtained by the method of claim 1.

* * * * *